(12) United States Patent
Prieur (10) Patent No.: US 10,724,481 B2
(45) Date of Patent: Jul. 28, 2020

(54) AIR CENTRIFUGATION DEVICE

(71) Applicant: Andre Prieur, La Garenne Colombes (FR)

(72) Inventor: Andre Prieur, La Garenne Colombes (FR)

( * ) Notice: Subject to any disclaimer, the term of this patent is extended or adjusted under 35 U.S.C. 154(b) by 612 days.

(21) Appl. No.: 14/350,636

(22) PCT Filed: Oct. 1, 2012

(86) PCT No.: PCT/EP2012/004116
§ 371 (c)(1),
(2) Date: Apr. 9, 2014

(87) PCT Pub. No.: WO2013/053443
PCT Pub. Date: Apr. 18, 2013

(65) Prior Publication Data
US 2014/0261278 A1  Sep. 18, 2014

(30) Foreign Application Priority Data
Oct. 11, 2011 (FR) ...................... 11 03087

(51) Int. Cl.
*F02M 35/00* (2006.01)
*F02M 25/12* (2006.01)
(52) U.S. Cl.
CPC ............ *F02M 35/00* (2013.01); *F02M 25/12* (2013.01); *Y02T 10/121* (2013.01)
(58) Field of Classification Search
USPC ... 123/184.21, 58.7, 383, 528, 559.1, 559.2, 123/562, 563, 564, 565, 566, 567, 592,
(Continued)

(56) References Cited

U.S. PATENT DOCUMENTS

| 4,351,302 A | 9/1982 | Brettler | |
| 6,289,884 B1 * | 9/2001 | Blandino et al. | 123/585 |

(Continued)

FOREIGN PATENT DOCUMENTS

| DE | 100 50 897 A1 | 6/2001 |
| JP | 63-90653 | 4/1988 |

(Continued)

OTHER PUBLICATIONS

International Search Report, dated Mar. 21, 2013, from corresponding PCT application.

(Continued)

*Primary Examiner* — Lindsay M Low
*Assistant Examiner* — Ruben Picon-Feliciano
(74) *Attorney, Agent, or Firm* — Young & Thompson (57) ABSTRACT

An air centrifugation device (1), associated to an internal combustion engine (2), which includes at least one cylinder (21), provided with air by an air intake (22), and rejecting combustion gases by an exhaust orifice (23), includes a wheel (11), provided with blades to accelerate the gases by a rotational movement, the wheel is mounted on an axle (12) and placed inside an envelope (13) containing the wheel, while the envelope has preferably a circular shape, the whole system including at least one air intake orifice (14) and at least two distinct exhaust orifices (15) and (16), provided to collect separately the oxygen molecules from exhaust orifice (15), and the nitrogen molecules from exhaust orifice (16), while at least one connecting pipe (3) is provided between the oxygen exhaust orifice and the air inlet system (24) of the internal combustion engine.

18 Claims, 4 Drawing Sheets (58) Field of Classification Search
USPC ......... 123/593, 560, 561, 585, 66; 60/605.1; 95/31–35, 270; 55/406
See application file for complete search history.

(56) References Cited

U.S. PATENT DOCUMENTS

| | | |
|---|---|---|
| 6,363,923 B1 | 4/2002 | Pletschacher |
| 2005/0199231 A1 | 9/2005 | Heider |
| 2007/0101975 A1 | 5/2007 | Moon |
| 2009/0038474 A1* | 2/2009 | Moktader ............ B01D 50/002 95/34 |

FOREIGN PATENT DOCUMENTS

| | | |
|---|---|---|
| JP | 01-294953 | 11/1989 |
| JP | 2002-528670 | 9/2002 |

OTHER PUBLICATIONS

JP Office Action, dated Apr. 28, 2015; Application No. 2014-534960.

\* cited by examiner

AIR CENTRIFUGATION DEVICE

The present invention relates to an air centrifugation device, allowing to separate oxygen molecules from nitrogen molecules. The invention has advantageous applications in the field of internal combustion engines, and more specifically in the field of motor vehicles fitted with such engines.

Generally speaking, internal combustion engines are equipped with an air inlet system comprising an air filter and possibly various devices, as one or several air compressors or turbochargers, intended to compress the air admitted inside the combustion chamber of the engine.

The fresh air generally constitutes the main oxidizer admitted inside the combustion chambers and is composed, in normal temperature and pressure conditions, of a mixture comprising, in addition to water vapor, a dry extract made up of approximately 78.1% nitrogen and 20.9% oxygen in volume, plus approximately 1% of other gases, as argon and carbon dioxide. These proportions, when referring to masses, are respectively of 75.5% for the nitrogen and 23.1% for the oxygen.

The engine control system for the internal combustion engine is normally designed according to these proportions, which may vary depending on weather conditions or altitude. Engine control systems are normally designed to optimize combustion efficiency and minimize the emissions of pollutants, especially carbon and nitrogen oxides. The disadvantage of such engine control systems is that the constituents found in the intake air, are not easily adjustable, essentially the proportion of oxygen, and therefore the thermodynamics' efficiency and optimization of pollutants emissions—by after-treatment, for example—are not easy to monitor.

The present invention offers a solution to partly overcome this problem, by describing a way to modify the proportions of oxygen and nitrogen admitted into the combustion chambers, by the means of a very high speed centrifugation device, taking advantage of the differences in the density of oxygen, which is at 1,429 kg/m3, and the density of nitrogen, which is at 1,251 kg/m3, in order to separate those two gases. In this way, the oxygen molecules may be separated from the nitrogen molecules by hyper centrifugation, and then be collected to be transferred through a pipe which is connected to the air inlet system of the internal combustion engine, the said pipe being possibly associated to a valve which may be monitored, allowing in this way to modulate the proportion of oxygen admitted inside the said air inlet system. In order to explain this principle and as a pure example, we will consider a device comprising a wheel designed with blades, with a rotation speed allowing to remain in the subsonic domain. The speed of sound in oxygen at 20° C. under normal atmospheric pressure is of 317 m/s. For nitrogen, in the same conditions, this speed is of 334.5 m/s. Therefore, if we consider a speed of 300 m/s at the extremity of the blades, we remain in all cases below the supersonic domain, considering pressures and temperatures at operating conditions. We will take, as an hypothesis, a wheel with a 100 mm circumference, which means a radius r of approximately 16 mm. To reach a peripheral speed V=300 m/s, the rotation speed of the wheel shall be of 3000 revolutions per second, which equals to 180,000 revolutions per minute, which remains in the same orders of magnitude as, for example, turbochargers. The centrifugal acceleration perceived near the circumference of the wheel ($V^2/r$) will be approximately of $5.65 \times 10E6$ m/s$^2$, which is more than 576,000 times the gravitational acceleration on earth, (9.81 m/s$^2$); the centrifugal force will be opposed to the forces resulting from the molecular agitation inside the mass of air submitted to high speed rotation. In this way, it is easy to calculate that, with the conditions above, the centrifugation of a 1 cm3 volume of oxygen taken under normal atmospheric pressure, which means a corresponding mass of 1.429 mg, generates a centrifugal force of 8.08 N, whereas for a 1 cm3 volume of nitrogen taken under the same conditions, which means a corresponding mass of 1.251 mg, the centrifugal force is only of 7.07 N. This difference causes a pressure difference between the 2 gases near the circumference of the centrifugal device, which generates a separation phenomenon between the oxygen, which is "heavier", and the nitrogen which is "less heavy". The oxygen is then rejected near the periphery of the centrifugal device, in a slightly compressed state, which allows to collect it, by the means of various systems described hereafter.

The present invention proposes an air centrifugation device, associated to an internal combustion engine, the said air centrifugation device comprising a wheel mounted on an axle and placed into an envelope containing the said wheel, the said envelope having preferably a circular shape, the whole system comprising at least one air intake orifice and at least two distinct exhaust orifices, designed to collect separately the oxygen molecules, on the one hand, and the nitrogen molecules, on the other hand, while at least one connecting pipe is provided between the oxygen exhaust orifice and the air inlet system of the internal combustion engine, the said connecting pipe being possibly equipped with a valve monitored to proportion correctly the quantity of oxygen admitted into the air inlet system of the internal combustion engine. According to the invention, the nitrogen may simply be rejected outside, without causing any harm to the environment, provided this occurs in a normally ventilated area. On the contrary, if the nitrogen is found to be interesting for the combustion or any other use, it is possible to isolate it and canalize it through a set of pipes and valves adapted to the use.

According to the invention, the air centrifugation device may be placed either upstream or downstream of the air compressors or turbochargers possibly provided in the air inlet system.

According to the invention, the said wheel mentioned above comprises blades designed according to the state of the art, intended to accelerate the gases by a rotational movement, in order to generate the centrifugal phenomenon. The axle of the said wheel, is driven at a very high rotation speed by the means of a motor and of a transmission device adapted for this purpose, otherwise, more advantageously, by using a turbine to collect the enthalpy of the exhaust gas of the internal combustion engine, using the well known principle of turbochargers. The solution retained to separate the gases being the use of a centrifugal force, the air intake orifice is placed advantageously near the central part of the envelope of the air centrifugation device, whereas the two distinct exhaust orifices are located on the said envelope, respectively at an intermediate position between the center of the wheel and the periphery of the said wheel for the nitrogen exhaust, and at a position close to the periphery of the said wheel for the oxygen exhaust. According to the invention, the shape of the envelope, for the part located near the periphery of the said wheel, is adapted in order to ease the collecting of oxygen and may comprise, for this purpose, a wider cross section allowing to generate a strip of gas of an appropriate thickness, to obtain optimal oxygen concentration.

A variation of the air centrifugation device related to the present invention, is defined by collecting the oxygen with the means of multiple small size orifices located on the envelope, near the circumference of the said wheel. This configuration allows to optimize the collecting of oxygen by providing a larger surface with a better permeability than a single exhaust orifice placed in a limited area, while a second envelope covering the first envelope, will allow to collect the oxygen extracted and canalize the said oxygen towards the air inlet system of the internal combustion engine.

A variation of the envelope of the air centrifugation device related to the present invention, is defined by providing a porous area located on the circumference of the said envelope, the said porous area being constituted as an example, by a semi permeable membrane, allowing the oxygen molecules through it, the said oxygen molecules being smaller in size than the nitrogen molecules, with a molecular diameter of 0.292 nm, while the said membrane would refrain the nitrogen molecules, bigger in size, with a molecular diameter of 0.315 nm. This solution then facilitates the separation of the oxygen molecules from the nitrogen molecules.

A variation of the invention is defined by adding an air cooling device upstream of the air centrifugation device, in order to somehow reduce the molecular agitation of the air before centrifugation and then improve the effect of the centrifugal force to separate the oxygen from the nitrogen. The said air cooling device, which will not be described here, may be similar to the well known state of the art cooling systems provided to lower the temperature of the compressed air from turbochargers.

A variation of the invention is defined by modifying the envelope of a turbocharger, when adding orifices positioned on the periphery of the said turbocharger, in order to collect the oxygen molecules found at the extremity of the blades. An orifice placed on the envelope of the turbocharger, in an intermediate position between the axis of the compressor's wheel and the periphery of the envelope, will allow to release the excess of nitrogen. This solution allows to combine within one single device, the compressor function and the separation of oxygen from nitrogen by centrifugation.

Other purposes and advantages of the present invention will appear in the description hereafter, as a non exhaustive example which will be made easier to understand by referring to the schematic drawings enclosed, which schematically describe a realization mode of the device proposed by the invention.

Figure 1:
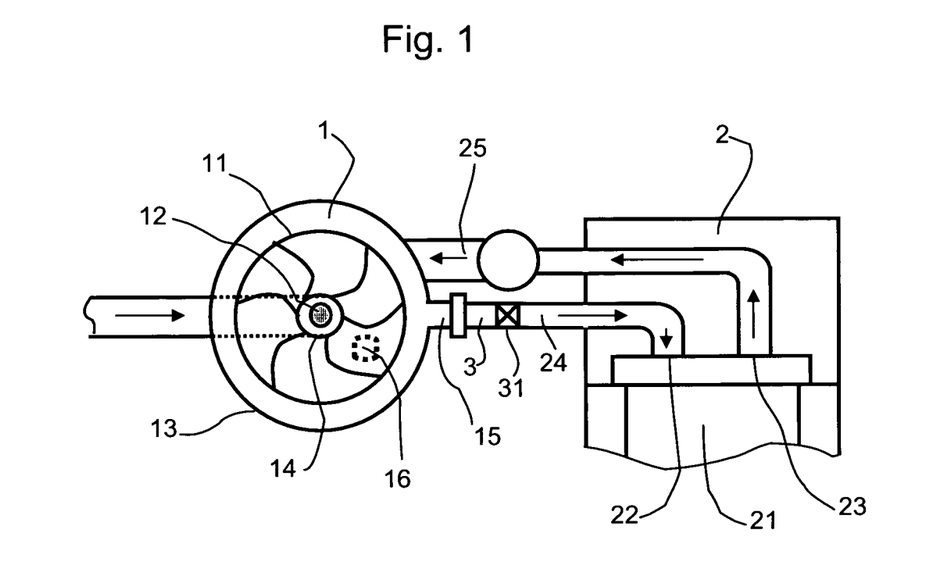
FIG. 1: schematic drawing of the air centrifugation device (1), side view
Figure 2:
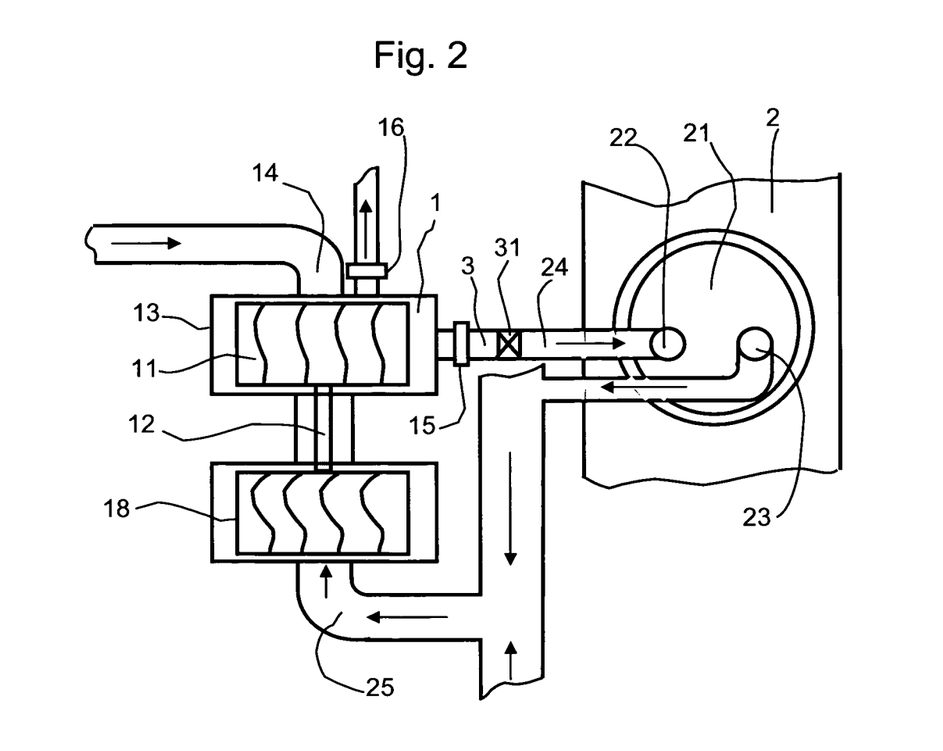
FIG. 2: schematic drawing of the air centrifugation device (1), viewed from the top
Figure 7:
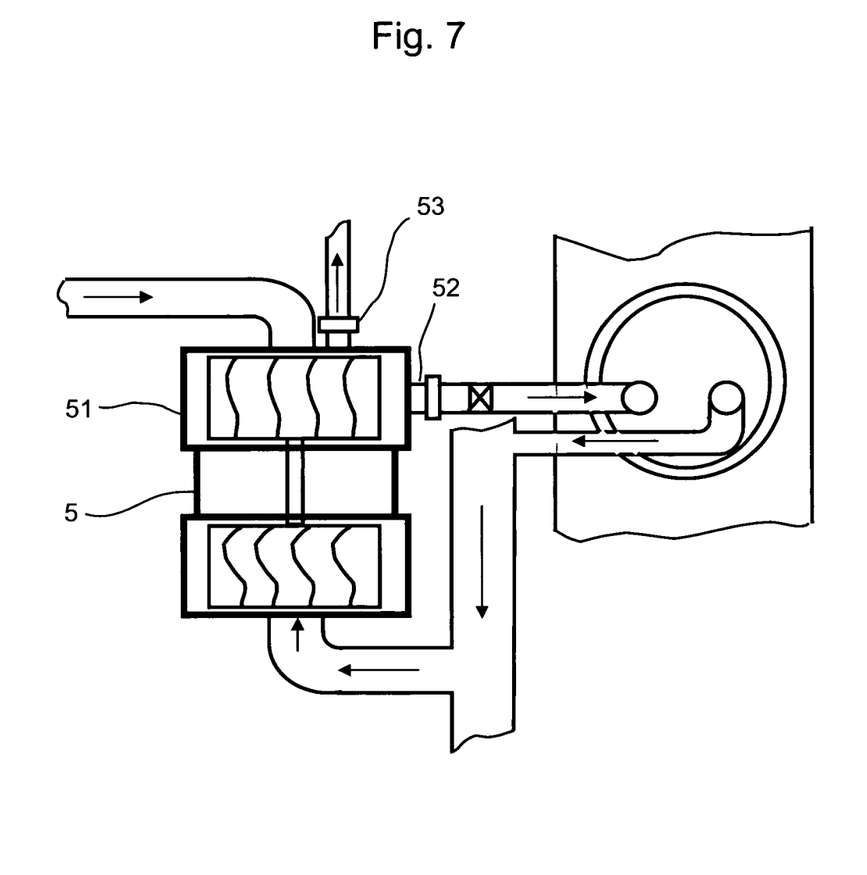

FIG. 7: schematic drawing of a variation of the invention, obtained by modifying a turbocharger (5) in order to obtain the separation between oxygen and nitrogen The present invention proposes an air centrifugation device (1), (FIG. 1 and FIG. 2), associated to an internal combustion engine (2), which comprises at least one cylinder (21), provided with air by an air intake (22), and rejecting combustion gases by an exhaust orifice (23), the said air centrifugation device (1) comprising a wheel (11), mounted on an axle (12) and placed inside an envelope (13) containing the said wheel (11), the said envelope (13) having preferably a circular shape, the whole system comprising at least one air intake orifice (14) and at least two distinct exhaust orifices (15) and (16), provided to collect separately the oxygen molecules from exhaust orifice (15), on the one hand, and the nitrogen molecules from exhaust orifice (16), on the other hand, while at least one connecting pipe (3) is provided between the oxygen exhaust orifice (15) and the air inlet system (24) of the internal combustion engine (2), the said connecting pipe (3) being possibly equipped with a valve (31), monitored to proportion correctly the quantity of oxygen admitted into the air inlet system (24). According to the invention, the air centrifugation device (1) may be placed either upstream or downstream of the air compressors or turbochargers possibly provided in the air inlet system (24).

According to the invention, the wheel (11) comprises blades designed according to the state of the art, intended to accelerate the gases by a rotational movement, in order to generate the centrifugal phenomenon. In the realization mode proposed here as an example (FIG. 2), the axle (12) of wheel (11) is driven at a very high rotation speed by the means of a turbine (18) placed in line with some elements of the exhaust system (25) of the internal combustion engine (2), according to the well known principle used for turbochargers. The air intake orifice for the air centrifugation device (1) is placed near the central part of envelope (13) of the said air centrifugation device, while the exhaust orifice (15) provided to collect the oxygen is located on envelope (13), at a position near the periphery of the wheel (11), whereas the exhaust orifice (16) provided to evacuate the nitrogen is also located on envelope (13), but at an intermediate position between the axis of wheel (11) and the periphery of said wheel (11).

Figure 3:
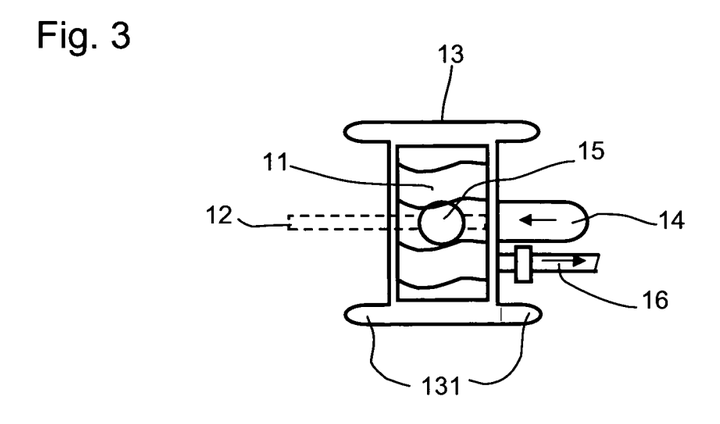
FIG. 3: schematic drawing of a possible variation for the envelope (13) of the air centrifugation device (1)

According to the invention, the shape of envelope (13), for the part located near the periphery of said wheel (11), is adapted in order to ease the collecting of the oxygen and may comprise, for this purpose, a wider cross section (131), (FIG. 3), allowing to generate a strip of gas of an appropriate thickness, to obtain optimal oxygen concentration.

Figure 4:
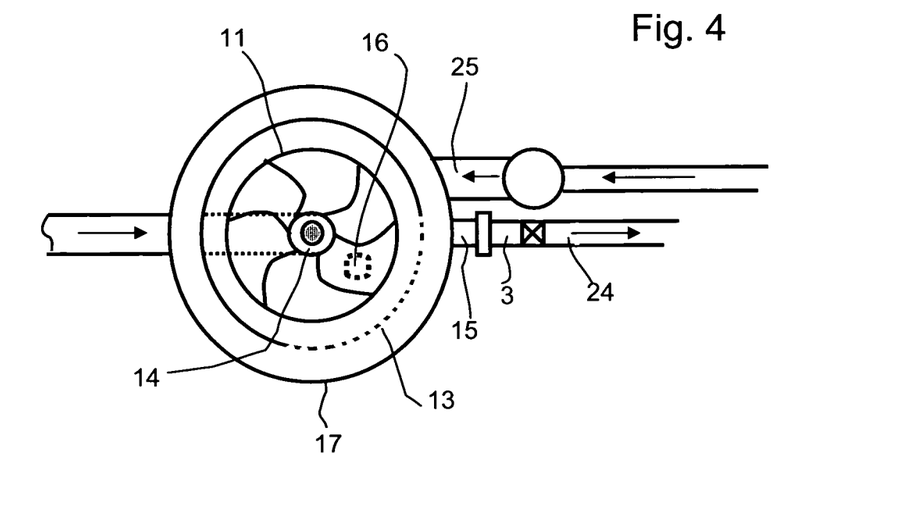
FIG. 4: schematic drawing of a variation for the envelope (13) obtained by adding multiple orifices on the periphery of the said envelope, in order to optimize the collecting of the oxygen

A variation of the air centrifugation device (1) related to the present invention, is defined by collecting the oxygen with the means of multiple small size orifices located on envelope (13), near the circumference of the wheel (11), (FIG. 4). In this case, a second envelope (17), covering the first envelope (13), will allow to collect the oxygen extracted and canalize the said oxygen towards the air inlet system (24) of the internal combustion engine (2).

Figure 5:
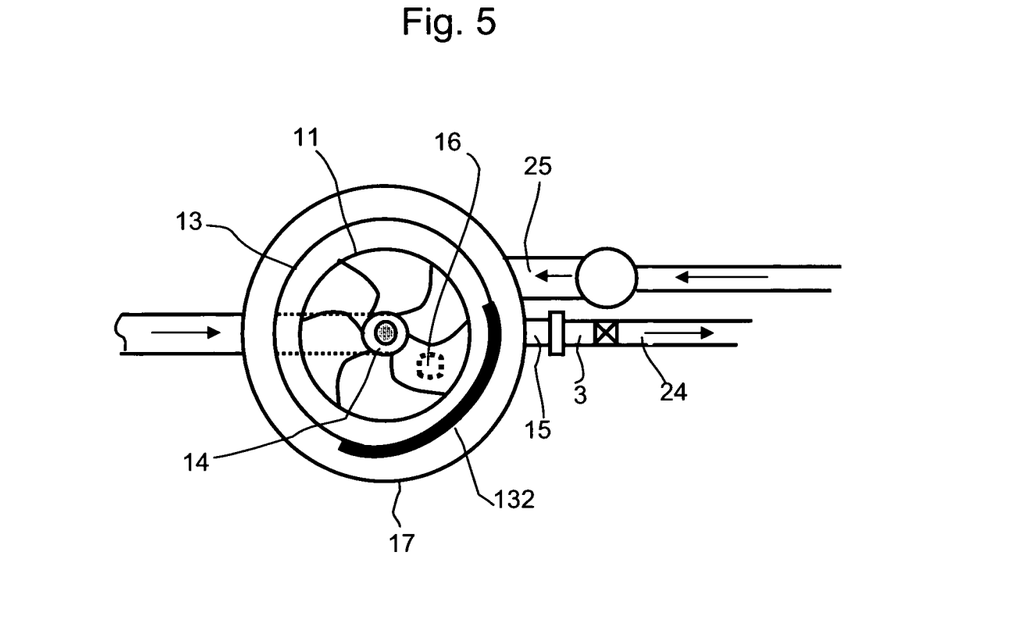
FIG. 5: schematic drawing of a variation for the envelope (13) obtained by adding a porous area (132) on the periphery of the said envelope, in order to optimize the separation between oxygen and nitrogen

A variation of the air centrifugation device (1) related to the present invention, is defined by collecting the oxygen through a porous area (132), permeable to oxygen molecules and located on envelope (13), close to the circumference of wheel (11), (FIG. 5). Also in this case, a second envelope (17), covering the first envelope (13), will allow to collect the oxygen extracted and canalize the said oxygen towards the air inlet system (24) of the internal combustion engine (2).

Figure 6:
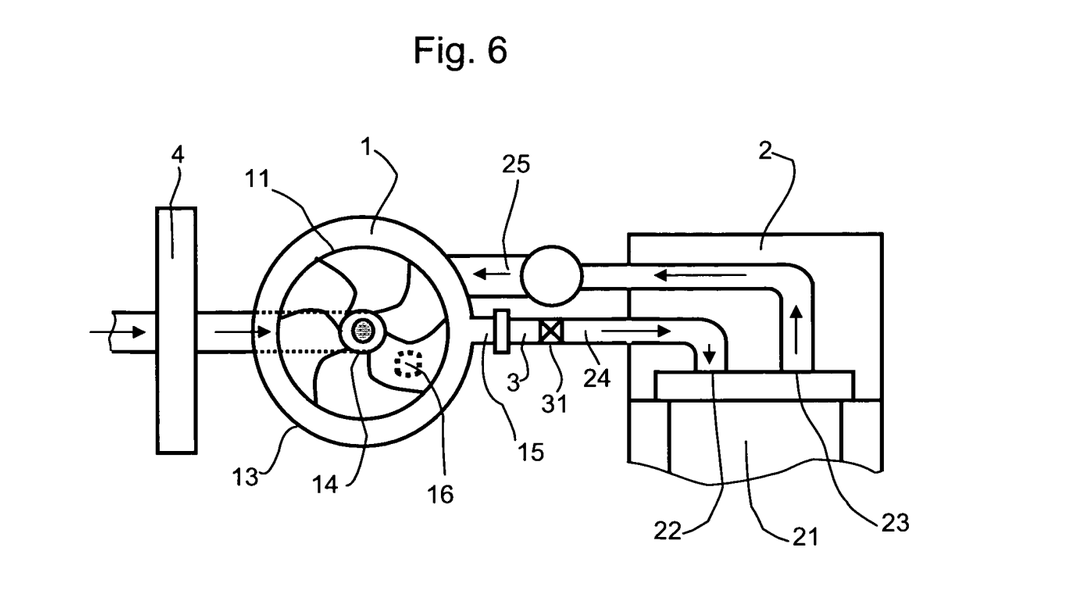
FIG. 6: schematic drawing of a variation of the invention, obtained by adding an air cooling device (4) placed upstream of the air centrifugation device (1)

A variation of the invention is defined by adding an air cooling device (4), (FIG. 6), located upstream of the air centrifugation device (1), in order to somehow reduce the molecular agitation of the gases before centrifugation. The said air cooling device (4) will not be described here, but may be similar to the well known state of the art cooling systems, for example air to air intercooler, or otherwise air to liquid thermal exchanger, provided to decrease the temperature of the compressed air from turbochargers.

A variation of the invention is defined by modifying the envelope (51) of a turbocharger (5), (FIG. 7), by adding one or several orifices (52) positioned on the periphery of the said turbocharger (5), in order to collect the oxygen molecules found in this area. An orifice (53) placed on the envelope (51) of the turbocharger (5), in an intermediate position between the axis of the later and the periphery of envelope (51), will allow to release the nitrogen. This solution allows to combine within one single device, the compressor function and the separation of oxygen from nitrogen by centrifugation.

The invention claimed is:

1. Air centrifugation device, associated to an internal combustion engine (2) having an air inlet system (24) and an exhaust system (25), which comprises at least one cylinder (21), provided with air by an air intake (22), and rejecting combustion gases by an exhaust orifice (23), said air centrifugation device (1) comprising a wheel (11), mounted on an axle (12) and placed inside an envelope (13) containing said wheel (11), said envelope (13) having a circular shape, the whole system comprising at least one air intake orifice (14) and at least two distinct exhaust orifices (15, 16), provided to collect separately oxygen molecules from an oxygen exhaust orifice (15), and nitrogen molecules from a nitrogen exhaust orifice (16), while at least one connecting pipe (3) is provided between the oxygen exhaust orifice (15) and the air inlet system (24) of the internal combustion engine (2), wherein, said wheel (11) comprises blades intended to accelerate the gases by a rotational movement, the axle (12) of said wheel (11) being driven in rotation, by a turbine (18) placed in line with some elements of the exhaust system (25) of the internal combustion engine (2), or by a motor and a transmission device adapted to transmit rotary movement of the motor to the axle, the blades having a forward edge and a rear edge, the wheel having an axial length extending from the forward edge of the blades to the rear edge of the blades, the axial length being smaller than an interior diameter of said envelope (13), the air intake orifice (14) is placed near a central part of the envelope (13) of said air centrifugation device (1), while the oxygen exhaust orifice (15) provided to collect the oxygen is located on the envelope (13), at a position near a periphery of the wheel (11), whereas the nitrogen exhaust orifice (16) provided to evacuate the nitrogen is also located on the envelope (13), but at an intermediate position between the axis of the wheel (11) and the periphery of said wheel (11), and the shape of the envelope (13), for a part located near the periphery of wheel (11), comprises a cross section (131) that is locally wider than a part of the envelope that is nearer the axis of the wheel, wherein said part located radially closer the periphery of wheel (11) provides a volume of space designed to generate a strip of gas through a thickness of which the oxygen is concentrated.

2. Air centrifugation device as described in claim 1, wherein the oxygen is collected by the means of multiple small size orifices located on the envelope (13) containing the said wheel (11), near the circumference of the wheel (11), while a second envelope (17), covering the envelope (13) containing the said wheel (11), allows to collect the oxygen extracted and canalize said oxygen towards the air inlet system (24) of the internal combustion engine (2).

3. Air centrifugation device as described in claim 1, wherein a porous area (132), permeable to oxygen molecules, is located on the envelope (13) containing the said wheel (11), close to the circumference of wheel (11), while a second envelope (17), covering the envelope (13) containing the said wheel (11), allows to collect the oxygen extracted and canalize said oxygen towards the air inlet system (24) of the internal combustion engine (2).

4. Air centrifugation device as described in claim 1, wherein an air cooling device (4) is located upstream of the air centrifugation device (1).

5. Air centrifugation device as described in claim 1, wherein one or plural orifices (52) are placed on a periphery of an envelope (51) of a turbocharger (5), in order to collect the oxygen, while another orifice (53) is placed on the envelope (51) of said turbocharger (5), in an intermediate position between the axis of the turbocharger (5) and the periphery of envelope (51) of the turbocharger (5), allowing to evacuate the nitrogen.

6. Air centrifugation device as described in claim 1, wherein the axle (12) of the wheel (11) is driven in rotation by the turbine (18).

7. Air centrifugation device as described in claim 1, wherein the axle (12) of the wheel (11) is driven in rotation by the motor and the transmission device.

8. Air centrifugation device as described in claim 1, wherein, said axle (12) of said wheel (11) is driven in rotation by the turbine (18) placed in line with elements of the exhaust system (25) of the internal combustion engine (2), and wherein one or plural orifices (52) are placed on a periphery of an envelope (51) of a turbocharger (5) to collect the oxygen, while another orifice (53) is placed on the envelope (51) of said turbocharger (5), in an intermediate position between the axis of the turbocharger (5) and the periphery of envelope (51) of the turbocharger (5) allowing to evacuate the nitrogen.

9. A combination of an air centrifugation device (1) and an internal combustion engine (2), wherein, the internal combustion engine comprises an air inlet system (24) with an air intake (22), an exhaust system (25) with an exhaust orifice (23), and a cylinder (21) provided with air by the air intake (22) and rejecting combustion gases by the exhaust orifice (23), said air centrifugation device (1) comprises an axle (12), a wheel (11) having an axis and blades, the wheel mounted on the axle (12), the blades having a forward edge and a rear edge, the wheel having an axial length extending from the forward edge of the blades to the rear edge of the blades, the axial length being smaller than an interior diameter of said envelope (13), a first envelope (13) containing said wheel (11), the wheel (11) located inside the first envelope (13), an air intake orifice (14), an oxygen exhaust orifice (15) for collecting oxygen molecules, a nitrogen exhaust orifice (16) for collecting nitrogen molecules, the oxygen and nitrogen exhaust orifices (15, 16) respectively and separately collecting the oxygen molecules from the oxygen exhaust orifice (15) and the nitrogen molecules from the nitrogen exhaust orifice (16), and a connecting pipe (3) connecting the oxygen exhaust orifice (15) to the air inlet system (24) of the internal combustion engine (2), wherein the blades of the wheel (11), under rotational movement, generate a centrifugal acceleration that separates the oxygen molecules from the nitrogen molecules, wherein the air intake orifice (14) is located near a central part of the first envelope (13), wherein the oxygen exhaust orifice (15) is located on the first envelope (13) at a position near a periphery of the wheel (11), wherein the nitrogen exhaust orifice (16) is located on the first envelope (13) at an intermediate position between the axis of the wheel (11) and the periphery of said wheel (11), and wherein a shape of the first envelope (13), for a part located near the periphery of wheel (11), that generates a strip of gas through a thickness of which the oxygen molecules are concentrated, has a first cross-section (131) that is locally wider than a cross section of an adjacent part of the first envelope that is radially closer to the axis of the wheel.

10. The combination of claim 9, wherein the axle (12) of the wheel (11) is driven in rotation by a turbine (18) placed in line with elements of the exhaust system (25).

11. The combination of claim 9, wherein the axle (12) of the wheel (11) is driven in rotation, by a motor and a transmission device that transmits rotary movement of the motor to the axle (12) of the wheel (11).

12. The combination of claim 9, wherein the oxygen molecules are collected by plural orifices located on the first envelope (13), near the circumference of the wheel (11), and a second envelope (17), covering the first envelope (13), collects the oxygen molecules extracted and canalizes the oxygen molecules towards the air inlet system (24).

13. The combination of claim 9, wherein,
a porous area (132), permeable to the oxygen molecules, is located on the first envelope (13), close to the circumference of the wheel (11), and
a second envelope (17), covering the first envelope (13), collects the oxygen molecules extracted and canalizes said oxygen molecules towards the air inlet system (24).

14. The combination of claim 9, wherein an air cooling device (4) is located upstream of the air centrifugation device (1).

15. The combination of claim 9, wherein,
at least one orifice (52) is placed on a periphery of an envelope (51) of a turbocharger (5), in order to collect the oxygen molecules, and
another orifice (53) is placed on the envelope (51) of said turbocharger (5), in an intermediate position between the axis of the turbocharger (5) and the periphery of the envelope (51) of a turbocharger (5), to evacuate the nitrogen molecules.

16. A combination of an air centrifugation device (1) and an internal combustion engine (2), wherein,
the internal combustion engine comprises an air inlet system (24) with an air intake (22), an exhaust system (25) with an exhaust orifice (23), and a cylinder (21) provided with air by the air intake (22) and rejecting combustion gases by the exhaust orifice (23), said air centrifugation device (1) comprises
an axle (12),
a wheel (11) having an axis and blades, the wheel being mounted on the axle (12), the blades having a forward edge and a rear edge, the wheel (11) having an axial length extending from the forward edge of the blades to the rear edge of the blades, the axial length being smaller than an interior diameter of said envelope (13), the wheel (11) having a radial periphery, an envelope (13) containing said wheel (11), the wheel (11) being located inside the envelope (13), the envelope (13) being comprised of an inner part adjacent the axis of the wheel and an outer part (131) attached to the inner part, the inner part being comprised of i) a front wall located adjacent the forward edge of the blades and extending radially from the axis of the wheel, and ii) a rear wall located adjacent the rear edge of the blades and extending radially from the axis of the wheel, the outer part being attached to an outer edge of the front wall and an outer edge of the rear wall, the outer part being a radial periphery part that surrounds the radial periphery of the wheel, the outer part extending over the whole axial extent of the wheel and protruding beyond both the outer edge of the front wall and beyond the outer edge of the rear wall, the outer part providing a volume of space, beyond the radial periphery of the wheel, designed to generate a strip of gas through a thickness of which oxygen is concentrated, wherein i) a first axial extent of the envelope at the inner part is defined between an outer surface of the front wall and an outer surface of the rear wall, and ii) a second axial extent of the envelope at the outer part, beyond the radial periphery of the wheel, is defined between an outer front edge of the outer part and an outer rear edge of the outer part such that the space, beyond the radial periphery of the wheel, designed to generate a strip of gas through a thickness of which oxygen is concentrated extends beyond both the outer edge of the front wall and beyond the outer edge of the rear wall, the second axial extent being greater than the first axial extent, an air intake orifice (14), an oxygen exhaust orifice (15) for collecting oxygen molecules, a nitrogen exhaust orifice (16) for collecting nitrogen molecules, the oxygen and nitrogen exhaust orifices (15, 16) respectively and separately collecting the oxygen molecules from the oxygen exhaust orifice (15) and the nitrogen molecules from the nitrogen exhaust orifice (16), and a connecting pipe (3) connecting the oxygen exhaust orifice (15) to the air inlet system (24) of the internal combustion engine (2), wherein the blades of the wheel (11), under rotational movement, generate a centrifugal acceleration that separates the oxygen molecules from the nitrogen molecules, wherein the air intake orifice (14) is located near a central part of the envelope (13), wherein the oxygen exhaust orifice (15) is located on the envelope (13) at a position near a periphery of the wheel (11), and wherein the nitrogen exhaust orifice (16) is located on the envelope (13) at an intermediate position between the axis of the wheel (11) and the periphery of said wheel (11).

17. A turbocharger (5), associated to an internal combustion engine having an air inlet system and an exhaust system, which comprises at least one cylinder, provided with air by an air intake, and rejecting combustion gases by an exhaust orifice, said turbocharger comprising a compressor wheel, mounted on an axle and placed inside an envelope (51) of said turbocharger, containing said wheel, said envelope (51) having a circular shape, the whole system comprising at least one air intake orifice and at least two distinct exhaust orifices, provided to collect separately oxygen molecules from an oxygen exhaust orifice, and nitrogen molecules from a nitrogen exhaust orifice, while at least one connecting pipe is provided between the oxygen exhaust orifice and the air inlet system of the internal combustion engine, wherein, said wheel comprises blades intended to accelerate the gases by a rotational movement, the axle of said wheel being driven in rotation, by a turbine of said turbocharger placed inside the envelope (51) of said turbocharger (5) and, in line with some elements of the exhaust system of the internal combustion engine, the air intake orifice is placed near a central part of the envelope (51) of said turbocharger (5), while one or plural orifices (52) are placed on the envelope of said turbocharger (5) to collect the oxygen, at a position near a periphery of the wheel, whereas a nitrogen exhaust orifice (53) provided to evacuate the nitrogen is also located on the envelope (51) of said turbocharger (5), but at an intermediate position between the axis of the wheel and the periphery of said wheel, and the shape of the envelope (51) of said turbocharger (5), for a part located near the periphery of wheel, comprises a cross section that is locally wider than a part of the envelope that is nearer the axis of the wheel, wherein said part located radially closer the periphery of wheel provides a volume of space designed to generate a strip of gas through a thickness of which the oxygen is concentrated.

18. The turbocharger of claim 17, wherein, the blades having a forward edge and a rear edge, the wheel having an axial length extending from the forward edge of the blades to the rear edge of the blades, the axial length being smaller than an interior diameter of said envelope (13).

* * * * *